US006175069B1

(12) United States Patent
Longacre (10) Patent No.: US 6,175,069 B1
(45) Date of Patent: Jan. 16, 2001

(54) MUSIC INSTRUCTION APPARATUS

(76) Inventor: Marie Longacre, 433 Orchard La., Medina, OH (US) 44256

( * ) Notice: Under 35 U.S.C. 154(b), the term of this patent shall be extended for 0 days.

(21) Appl. No.: 09/474,425

(22) Filed: Dec. 29, 1999

(51) Int. Cl.[7] .................................................. G09B 15/02
(52) U.S. Cl. .............................. 84/476; 84/470 R; 84/600
(58) Field of Search .................................. 84/470 R, 476, 84/600

(56) References Cited

U.S. PATENT DOCUMENTS

| 3,982,463 | * | 9/1976 | Waters, Jr. ............................. | 84/476 |
| 4,069,735 | * | 1/1978 | Bertram . | |
| 4,924,743 | * | 5/1990 | Tsai ....................................... | 84/476 |
| 5,349,129 | * | 9/1994 | Wisniewski et al. .................. | 84/600 |
| 5,949,010 | * | 9/1999 | Hacker ................................... | 84/476 |

* cited by examiner

Primary Examiner—Jeffrey Donels (74) Attorney, Agent, or Firm—Christopher L. Parmelee; Ralph E. Jocke (57) ABSTRACT

A music instruction apparatus. The apparatus includes a support frame (13), a plurality of blocks (22) in rotating connection with the support frame. The blocks are organized in an array pattern of thirteen rows (101–113) and eight columns (121–128). Each of the blocks has a first side (30) that includes indicia representative of a music note (32). When the blocks are oriented such that the first sides of each block are viewable, each row displays music notes that correspond to a major music scale. A subset of the blocks in each row have a second side (34) that include indicia (36) representative of music notes that are a half step in tone away from the first note on the corresponding block. By rotating a selection of blocks to their second sides, the music notes of a minor scale which corresponds to the major scale can be displayed. Each block also has blank side (51). By rotating a selection of the blocks to the blank side, the music notes that correspond to a chord can be displayed. By changing the blocks to display different scales and chords, the apparatus enables a student to interactively practice constructing chords and scales.

20 Claims, 5 Drawing Sheets

MUSIC INSTRUCTION APPARATUS

TECHNICAL FIELD

This invention relates to a music instruction apparatus. Specifically this invention relates to a new apparatus for teaching students the structure and relationships between different musical scales and chords.

BACKGROUND ART

Music instructional textbooks are the conventional resources for learning music theory. Music is an international language, therefore, certain rules, patterns, and formulas apply so that written music can be interpreted by all languages and all musical instruments.

Music is written with symbols that represent different things, and some symbols representing more than one thing. For example Music Notes are used to identify time value. Key Signatures are used to identify Sharps # and Flats b. Numbers such as 1 2 3 4 5 6 7 8 are used to identify degree of a scale. Roman numerals such as I II III IV V VI VII VIII are used to identify different degrees of a scale for identifying a chord. Letters such as C, Dm, G7, Eb are used to identify the names of chords. Music staff, treble staff and bass staff are used to identify lines and spaces on which music is written. Letters such as A B C D E F G are used to identify notes, scales, chords, lines and spaces.

All text books for teaching music theory or how to play a musical instrument use the music staff. This means that a student must be able to read the notes on lines and spaces. Although the written music is the same, different musical instruments such as keyboards, string instruments, and wind instruments produce sounds in different ways. The student is forced to learn scales and chords for corresponding instruments by finger memorization and repetition. Understanding and memorizing scales and chords by this method can be very difficult for a student first learning music theory.

Unfortunately most instructional books do not visually organize scales and chords in alternative formats which are easily understandable. Some texts include cryptic two-dimensional charts which compare the notes of one chord or scale to another. Other texts provide cryptic charts of whole steps and half steps taken to make scales and chords, all of which are shown on a music staff (lines and spaces). Other books use a chart commonly called the circle of fifths to show the relationships between Major scales, Minor scales, chords, and key signatures.

However, all of these books, charts, and tables are for reference purposes only. None of these materials offer an interactive mechanism for learning scales and chords. Consequently there exists a need for an apparatus that supplements the information in music instructional books by providing an easier method for learning music scales and chords. Learning and understanding scales and chords in the music language is as important as learning the alphabet and words in any language.

The prior art includes a few devices which are operative to display scales and chords, however, none of them are overly useful for learning scales and chords. For example prior art hand held computer devices have been developed which are operative to display the lines and spaces of a music staff. Again these lines and spaces are just as are found in a text book. Other prior art devices display the keys of a piano keyboard. Although these devices provide a quick and easy method to lookup the notes of a particular scale or chord, these devices are not practical for teaching a student the relationships between different scales and chords.

Consequently there exists a further need for an instructional apparatus that is useful for teaching a student which notes comprise major and minor scales. There further exists a need for a music instruction apparatus that is operative to teach a student how to construct chords from scales. There further exists a need for a music instruction apparatus that allows a student to learn music theory without first having to learn to read lines and spaces, note values and, music terminology.

DISCLOSURE OF INVENTION

It is an object of the present invention to provide an instructional apparatus which aides a student in learning and understanding music scales and chords.

It is a further object of the present invention to provide an apparatus which enables a student to interactively manipulate the musical notes that comprise scales and chords.

It is a further object of the present invention to provide an apparatus which enables a student to interactively construct a minor scale from a major scale.

It is a further object of the present invention to provide an apparatus which enables a student to interactively construct chords from a scale.

It is a further object of the present invention to provide an apparatus which enables a student to see and understand the names of the different degrees of a scale and chord.

It is a further object of the present invention to provide an apparatus which enables a student to physically construct chords from scales by using formulas.

Further objects of the present invention will be made apparent in the following Best Modes for Carrying Out Invention and the appended claims.

The foregoing objects are accomplished in one exemplary embodiment of the invention by a music instruction apparatus that includes music note selectors such as rotatable blocks arranged in an array pattern within a support frame. Each of the blocks includes a side that is blank and a side that includes indicia representative of a musical note. A plurality of the blocks have additional sides that include indicia representative of other musical notes. By rotating the blocks different musical scales and chords can be displayed.

To assist a student with understanding music theory and the construction of scales and chords, the array is organized in a format that is conducive to quickly learning the relationships between different scales and chords. In the exemplary embodiment the array pattern is comprised of 8 vertical columns and 13 horizontal rows. Each row includes blocks with musical notes that correspond to a Major Diatonic Scale. With thirteen rows, each of the 13 Major Diatonic Scales can be viewed at once.

For forming minor scales from the thirteen major scales, some of the blocks have second and third sides with music notes that are either a half tone (half step) above or below the musical note on the first side. A student is enabled to construct a minor scale from the major scale by turning the correct blocks to the second sides. In this described exemplary embodiment the first side is the front side of a block, the second side is the left side of the block, and the third side is the right side of the block.

For forming chords from the scales, some of the blocks can be turned to a blank side. The remaining blocks with visible notes are representative of chords that correspond to the originally displayed scales. These chords can be further changed to other corresponding chords by turning the blocks in the chord to display other notes that are a half tone (half step) above or below the original note in the original chord. By rotating one or more blocks, the present invention enables a student for example to interactively create minor chords from major chords, to create an augmented chord, to change a Major 7th chord to a Dominant 7th chord, or to change a Sixth chord to a Diminished chord.

In other exemplary embodiments, the described apparatus can further include a magnetic display board, or other medium for interactively displaying indicia representative of sheet music. With a magnetic display board for example, small circular magnets can be arranged on the lines and spaces of the music staff indicia to form scales and chords that correspond to the scales and chords being displayed by the rotating blocks of the present invention. Students can thus practice generating sheet music representative of scales and chords with the assistance of the interactive array of blocks.

For the present invention, the front, left and right sides of the blocks may have corresponding color schemes to aid the student in learning the relationships between different scales and chords. In other alternative forms of the invention, the blocks could have the named notes raised, or blocks marked with other physical features to enable the visually impaired to use the apparatus.

In other alternative forms of the invention, a computer can be programmed with appropriate software for displaying an array of musical notes and corresponding scales. Interactive graphic user interface music note selector elements can be used to change individual notes by a half tone (half step) up or down in a manner which corresponds to the turning of the blocks as described previously. These user interface music note selector elements can also be used to hide individual note indicia for interactively forming chords on the display device of the computer.

BEST MODES FOR CARRYING OUT INVENTION

Figure 1:
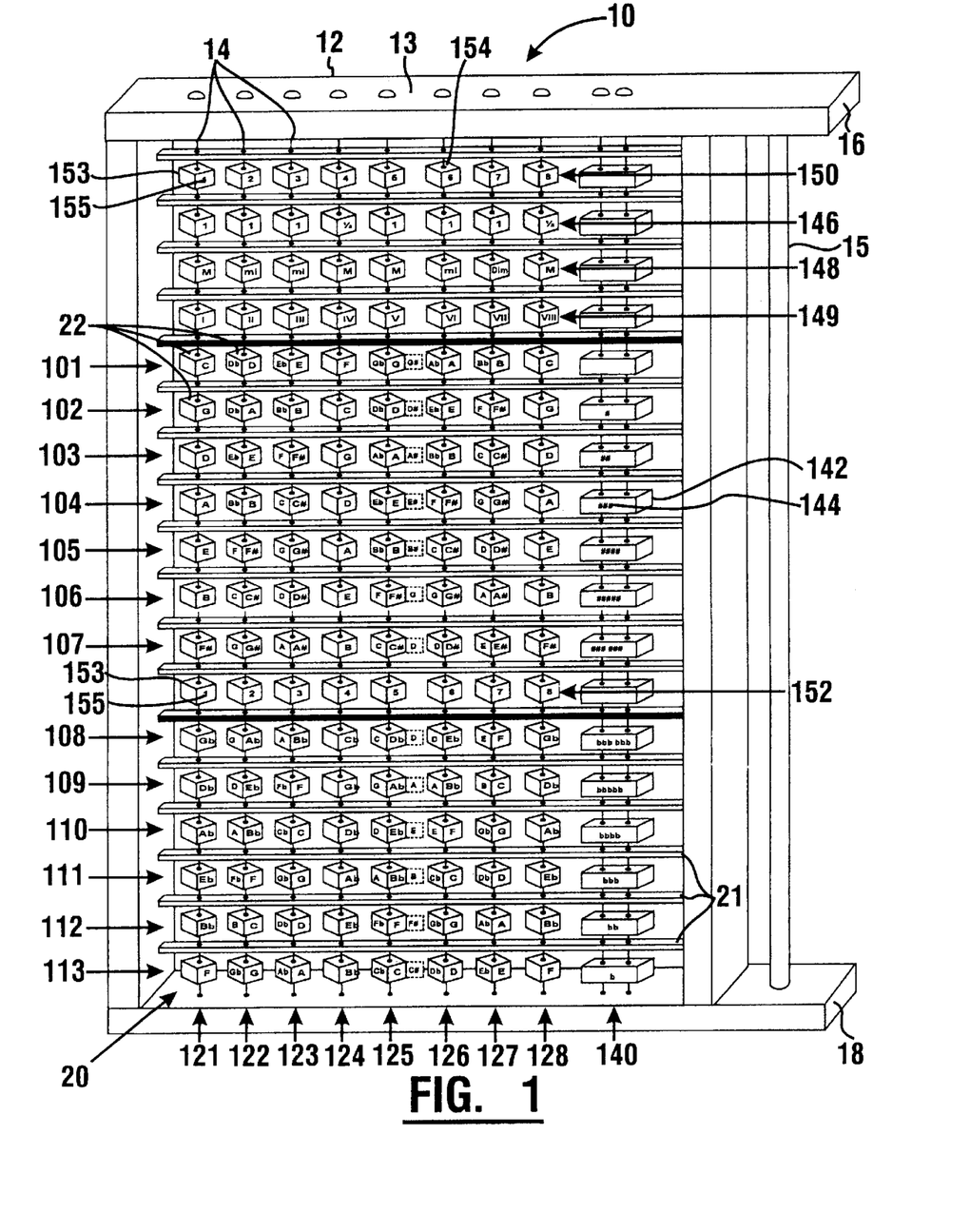
FIG. 1 is a front perspective view representative of an exemplary embodiment of the music instruction apparatus.

Referring now to the drawings and particularly to FIG. 1, there is shown therein, a schematic view representative of an exemplary embodiment of the music instruction apparatus. Here the music instruction apparatus 10 includes a music note display device 12. For this described embodiment the display device includes a support frame 13 with a handle 15. The support frame includes a plurality of vertical parallel rods 14 that extend between the upper and lower ends 16 and 18 of the support frame 10.

The display device further includes a plurality of music note selections 20 and a plurality of slats 21 that are operative to divide rows of the music note selectors 20. In this described embodiment each music selector 20 corresponds to cubical blocks 22. Each block 22 is in rotating connection with one of the rods 14. Also, in the exemplary embodiment the support frame 13 and blocks 22 are comprised of wood; however, in alternative embodiments the support frame and blocks may be comprised of other structural materials such as plastic or metal.

Figure 1A:
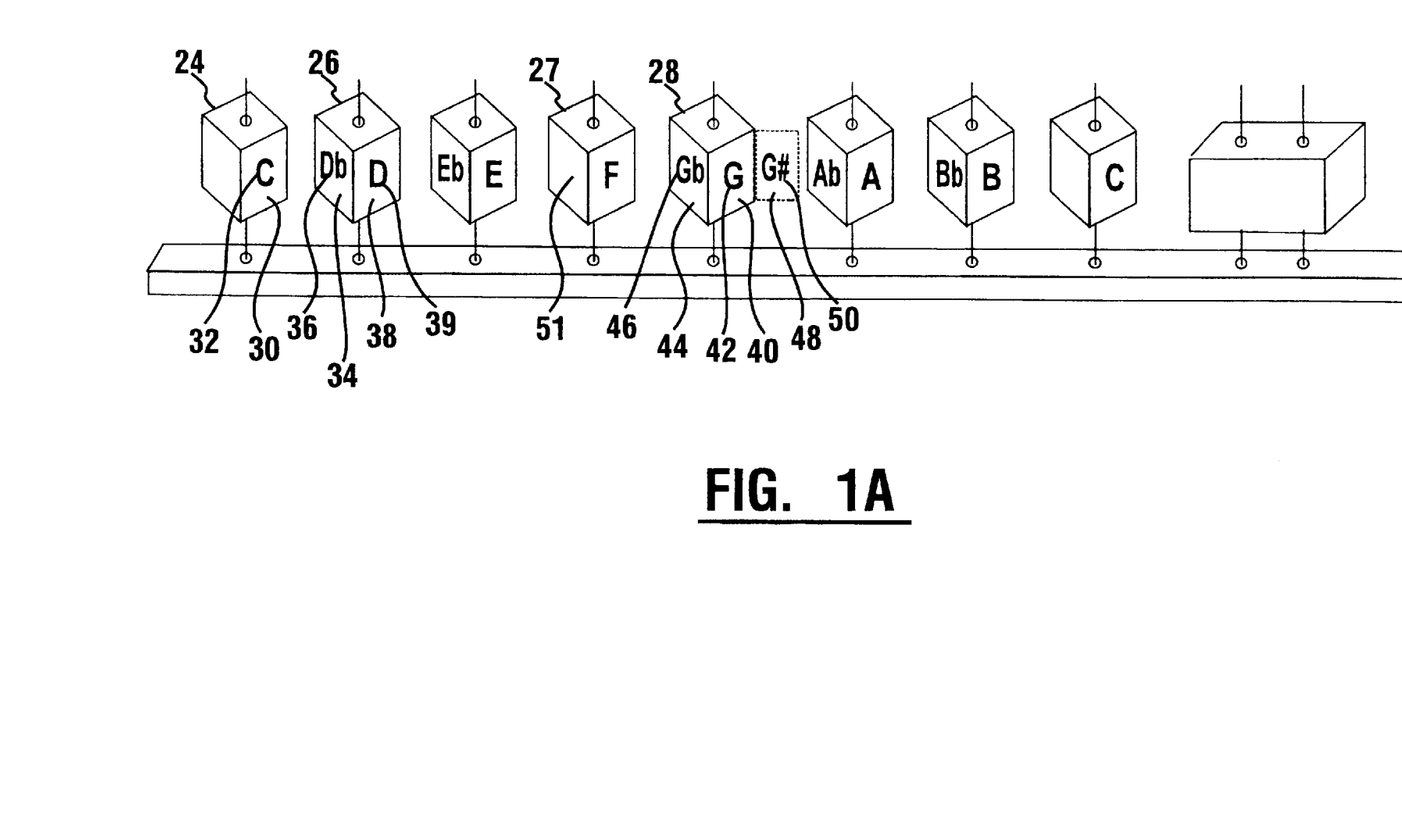

FIG. 1A shows the selectors from row 101 of the music note display device 12. As shown in FIG. 1A, the music note display device includes three different types of selectors, blocks 24, 26, and block 28. All selectors have a first side that includes indicia representative of a musical note. For example block 24 includes indicia 32 on first side 30 that is representative of a "C" music note. Block 24 is also representative of a one-way selector. One-way selector blocks have only one side with indicia representative of a note.

However, the display device also includes a plurality of multiple note blocks that have multiple sides with indicia representative of music notes. Block 26 is representative of a two-way selector block. Two-way selector blocks include a second side with indicia representative of a second music note. For each two-way selector, the second music note is always a half step in tone below the first note of the first side for the corresponding block. For example block 26 includes indicia representative of a "D" note 39 on a first side 38. On a second side 34, block 26 includes indicia representative of a "Db" or "D flat" music note 36. A "Db" "D" note is a half step in tone below a "D" note. A user is operative to alternatively display either the "D" note indicia 39 or the "Db" note indicia 36 by rotating block 26.

In addition a second subset of the blocks are three-way selector blocks. Three-way selector blocks also include a second side with indicia representative of a second music note that is a half step lower in tone than the first music note. In addition three-way selector blocks include a third side with indicia representative of a third music note that is a half step higher in tone than the first music note. For example block 28 includes a first side 40 with indicia 42 representative of a first music note "G". In addition block 28 includes a second side 44 with indicia 46 representative of a second music note "Gb" that is a half step lower in tone. Block 28 also includes a third side 48 (shown in phantom) which includes indicia 50 representative of a "G#" or "G" sharp that is a half step higher in tone. As with the two-way blocks, a user is operative to individually display the "G" note indicia 42, "Gb" note indicia 46, and the "G#" note indicia 50 by rotating the three-way block 28.

In addition to displaying indicia representative of musical notes, each block also includes at least one side that does not include music indicia. For example block 27 includes side 51 which is blank.

As shown in FIG. 1, the exemplary embodiment includes music note selectors 20 arranged in an array pattern. This embodiment includes thirteen sets or rows of blocks 101–113 with indicia representative of music notes. Each row includes at least eight blocks with indicia representative of music notes. These blocks are aligned in eight columns 121–128. The music note indicia on the first sides of each of the eight blocks in a row corresponds to a Major music scale. In the exemplary embodiment each of the thirteen rows corresponds to one of the thirteen Major Diatonic scales. For example, topmost row 101 includes eight blocks with indicia on the first sides of the blocks representative of the notes C, D, E, F, G, A, B and C. This sequence of notes corresponds to a C Major Scale. In the exemplary embodiment the other twelve rows 102–113 include blocks with indicia that correspond to the Major scales G, D, A, E, B, F#, Gb, Db, Ab, Eb, Bb, and F, wherein the lowercase "b" symbol represents a music note flat and the "#" symbol represents a music note sharp.

Figure 2:
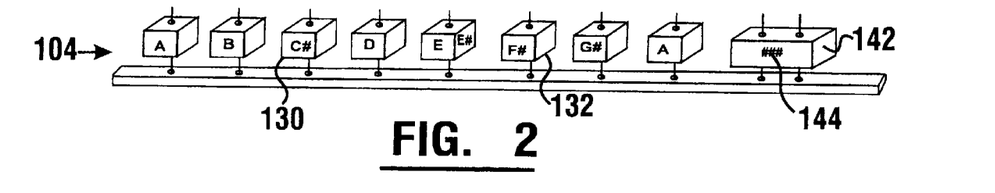
FIG. 2 is a perspective view representative of an exemplary set of blocks oriented in positions for displaying indicia representative of a Major A scale.
Figure 3:
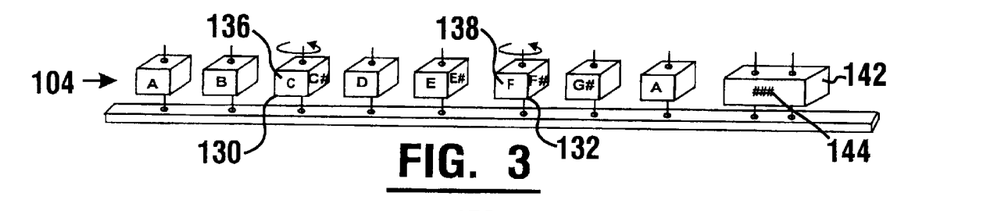
FIG. 3 is a perspective view representative of an exemplary set of blocks oriented in positions for displaying indicia representative of a Minor A scale.

Blocks in columns 121, 124, and 128 are one-way selector blocks. Blocks in columns 122, 123, 126, and 127 are two way selector blocks. Blocks in column 125 are three-way selector blocks. By turning certain two-way selector blocks to their corresponding second sides, a user is enabled to display a Minor scale. FIG. 2 shows the blocks in row 104. In this example each of the first sides are facing forward for displaying the notes of the A Major scale (notes A, B, C# D, E, F#, G#, A). FIG. 3 shows the same row 104 with blocks 130 and 132 rotated counterclockwise to display the second sides 136, 138. Thus, the forward facing notes of row 104 as shown in FIG. 3 are now representative of the A Minor scale (notes A, B, C, D, E, F, G# and A).

By rotating blocks in this manner, the present invention enables a student to change a row of blocks that is displaying a Major scale to a row of blocks that displays a corresponding Minor scale. The Relative Harmonic scale is found by using the note name of the 6th degree of a Major scale. The 6th degree of the C Major scale is A. The 3rd and 6th degrees of the A Major scale is then reduced a half tone by using the left side of blocks 130 and 132.

As shown in FIG. 1, the support frame also includes a column of non-rotating blocks 140 with indicia representative of the key signature of each row. The key signature represents the number of notes in the scale that are sharps or flats. The A Major scale includes three sharps. Consequently, the key signature block 142 for the A Major scale row 104 includes indicia 144 representative of three sharps (###).

In addition the exemplary embodiment also includes blocks for labeling different characteristic of each column of blocks. For example blocks in row 146 show the differences in tone (1 or ½ step) between adjacent notes of the Major scales. The 1 in column 121 stands for the first degree and the name of the scale. Thereafter, the 1 and ½ in row 146 represents 1 whole tone or step and ½ tone or step away from the preceding note or tone.

Blocks in row 148 label each column with values of "M", "mi", and "Dim", representative of the degree of the scales. In this example "M" represents Major, "mi" represents minor, "Dim" represent Diminished. These labels indicate whether a Major, Minor, or Diminished chord could be found within that scale.

Blocks in row 149 label each column with Roman numerals for referencing chords. Roman numerals represent a degree of a scale, which is used for transposing that note or chord name into another key. (Key Signature—Written in another Scale) Text books use Roman numerals to identify the notes in a melody rather than the note name, and to identify Chords, rather than by chord name. EXAMPLE: V7 would be the "G7" chord in the key of C. V7 would be the "E7" chord in the key of A. II would be the "D" note in the key of C. II would be the "B" note in the key of A.

Chord progressions are also written and identified with Roman numerals. Common chord progressions would be I IV I; I IV V I; and I V7 I. This enables a student to learns the chords in different keys (different scales). The array pattern displayed in this music instruction apparatus enables a student to easily find and understand scales and chords.

There are many parts to music theory, such as harmony and song writing. However, music theory is all based upon knowing and understanding scales and chords.

In the exemplary embodiment, the music note display device 12 also includes a pair of rows 150 and 152 with indicia representative of the number or degree of the music notes in a scale. For example degree blocks 153 include indicia representative of the first degree. Consequently, all of the music note indicia for the blocks in column 121 are notes of the 1st degree for the corresponding scales.

A student can use the degree indicia in rows 150 or 152 to identify and display the Relative Harmonic Minor Scale of a Major Scale. The present invention provides an interactive structure and guide for forming minor scales and a plurality of chords from the major scales.

It is known in music theory that the minor scale that corresponds to the 6th degree of a major scale is the relative harmonic minor scale of the major scale. Thus a student can use the music note display device to identify the 6th degree note of a major scale and interactively construct the corresponding relative harmonic minor scale.

Figure 4:
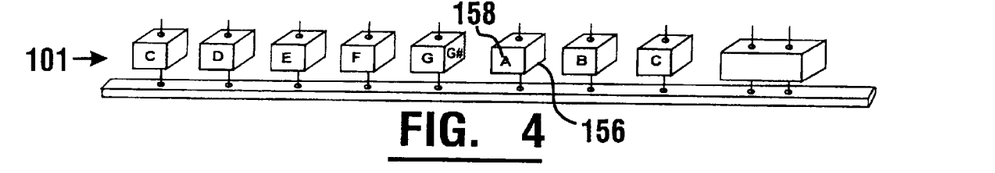
FIG. 4 is a perspective view representative of an exemplary set of blocks oriented in positions for displaying indicia representative of a Major C scale.

For example if a student wishes to find and display the relative harmonic of the C Major scale the student would first identify the note that corresponds to the 6th degree of the C Major scale. Degree block 154 includes indicia which identifies column 126 as corresponding to the $6^{th}$ degree. FIG. 4 shows the blocks of row 101 which correspond to the notes of the C Major scale. Block 156 corresponds to row 101 and includes indicia 158 representative of the musical note "A".

Once a student has identified the note "A" as being the 6th degree note of the C Major scale, he or she can locate the A Major scale found in row 104 of the music note display device 12. To form the relative harmonic scale of the C Major scale all the student has to do is rotate the correct blocks to form the A Minor scale.

As described in the examples above, a student can therefore rotate blocks 130 and 132 of the A Major scale row of 104 as shown in FIG. 2 to display the notes corresponding to the A Minor scale as shown in FIG. 3. By using a few simple rules in conjunction with the present invention, a student can derive which notes correspond to the relative harmonic minor scale for each of the Major Diatonic scales.

To further aid the student in understanding which notes correspond to the Major and Minor scales, the first sides of all the music note blocks share a first common color scheme. The second sides of the two-way and three-way blocks in columns 122 123 125 126 and 127 which include notes a half step lower in tone, share a second common color scheme. The third sides of the three-way blocks in column 125 which include notes a half step higher in tone, share a third common color scheme.

With these color schemes a student can quickly identify whether all the notes in a row correspond to a Major scale. If blocks are rotated, a student can quickly identify the color scheme of the facing block to identify if the blocks are a half step above or below in tone from the note that belongs to the Major scale.

Figure 5:
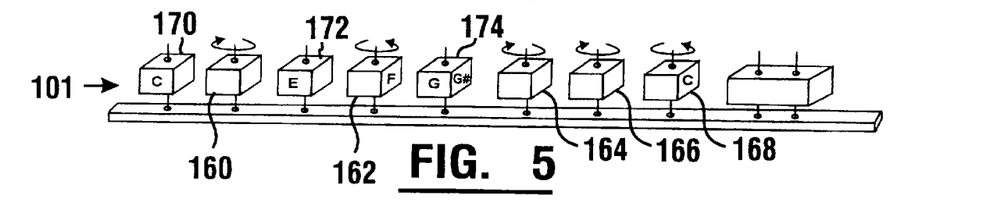
FIG. 5 is a perspective view representative of an exemplary set of blocks oriented in positions for displaying indicia representative of a Major triad chord.

As discussed previously each of the blocks include a side that is blank. By turning a subset of blocks in a row to their blank sides, a student can modify the rows 101–113 to display indicia representative of chords. For example FIG. 4 shows the row 101 with the blocks oriented to display the notes of the C Major scale. FIG. 5 shows row 101 with the block 160, 162, 164, 166, and 168 rotated to display their corresponding blank sides. The resulting indicia on blocks 170, 172, and 174 are representative of the notes of a C Major Triad chord (notes C, E, and G).

Figure 6:
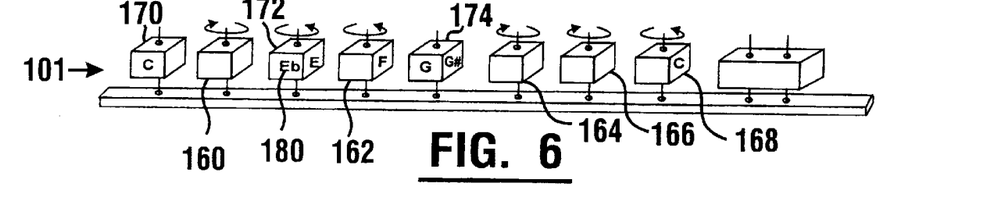
FIG. 6 is a perspective view representative of an exemplary set of blocks oriented in positions for displaying indicia representative of a Minor triad chord.

FIG. 6 shows row 101 with blocks 160, 162, 164, 166, and 168 again rotated to display their corresponding blank sides. However, block 172 has also been rotated counterclockwise to display indicia 180 representative of an "Eb". Thus for FIG. 6, the resulting indicia on blocks 170, 172, and 174 are representative of notes of a C Minor Triad chord (notes C, Eb, and G).

Figure 7:
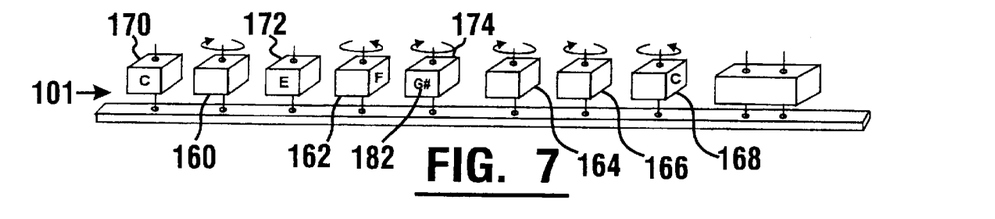
FIG. 7 is a perspective view representative of an exemplary set of blocks oriented in position for displaying indicia representative of an Augmented chord.

FIG. 7 also shows row 101 with blocks 160, 162, 164, 166, and 168 rotated to display their corresponding blank sides. Here block 174 which corresponds to a three-way block has been rotated clockwise to display indicia 182 representative of the music note "G#". Thus for FIG. 7, the resulting indicia on blocks 170, 172, and 174 are representative of notes of an Augmented C chord (notes C, E, and G#).

By selectively rotating the correct block 22 of the described exemplary embodiment a student is enabled to form Major Triad chords, Minor Triad chords, Augmented chords, Major $6^{th}$ chords, Minor $6^{th}$ chords, Dominant $7^{th}$ chords, Major $7^{th}$ chords, Minor $7^{th}$ chords, Dominant $7^{th}$ with Flatted $5^{th}$ chords, Dominant $7^{th}$ with Augmented $5^{th}$ chords, Diminished chords, $9^{th}$ chords, and Flatted $9^{th}$ chords.

In alternative embodiments of the present invention, wherein each row of music notes includes additional blocks representative of musical notes from the adjacent octave, other more complex chords could be constructed with the present invention. The chords are shown in the root position on the scales. However, the $1^{st}$ inversion and $2^{nd}$ inversion could also be shown.

A ninth chord is built on the $2^{nd}$ degree of a scale. A $10^{th}$ chord is built on the $3^{rd}$ degree of a scale. An $11^{th}$ chord is built on the $4^{th}$ degree of a scale. A $12^{th}$ note is built on the $5^{th}$ degree of a scale. A $13^{th}$ chord is built on the $6^{th}$ degree of a scale. A $14^{th}$ chord is built on the $7^{th}$ degree of a scale. A $15^{th}$ chord is built on the $8^{th}$ degree of a scale (same as $1^{st}$).

Further other embodiments of the present invention may have blocks in different shapes and sizes. For example two-way blocks may have triangular shapes with three displayable sides rather than the four associated with a cube-shaped block. The first of the three displayable sides would include indicia representative of a major scale note, the second side would include indicia representative of a music note a half step lower in tone, and the third side would be blank.

Further other embodiments of the present invention may have blocks with different texture to the different sides or with indicia to aid the visually impaired. In other alternative embodiments the rods could be horizontally located and the blocks may rotate along a horizontal axis. In addition the support frame may have individual rods or pivot pins for each individual block. It is to be understood that the present invention encompasses any user configureable selector that can selectively be adjusted to display indicia representative of different notes a half step in tone apart and also the absence of a note.

Figure 8:
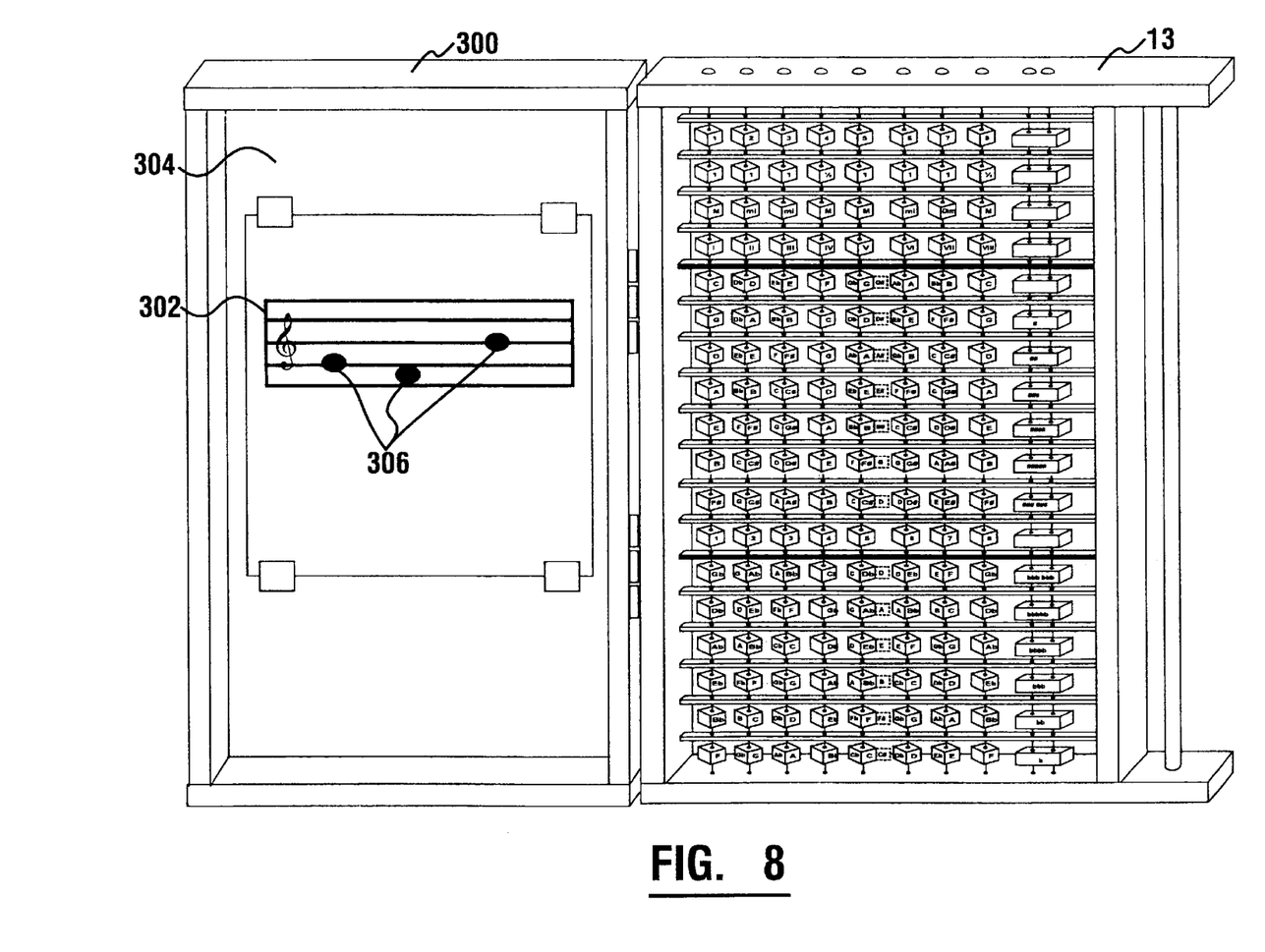
FIG. 8 is a schematic view representative of an alternative exemplary embodiment of the present invention that includes a magnetic display board constructing indicia representative of scales and chords on a grand staff with lines and spaces.

FIG. 8 shows another exemplary embodiment of the present invention, where the support frame further includes a hinged indicia display board 300. The hinged indicia display board moves between a closed and open position. In the closed position the display board 300 functions as a cover for the apparatus. In the open position as shown in FIG. 8 the display board can be used to display indicia representative of the music staff, treble and bass 302. For example in the described embodiment the display board includes a magnetic back 304 that is operative to support magnets 306 representative of music notes for the music staff. These magnets can be placed on the lines and spaces indicia of the music staff 302 to form scales and chords.

After a student manipulates the selectors 20 to identify music notes for a desired scale or chord, the student can practice generating the corresponding sheet music by placing the magnets 306 on the appropriate lines and spaces of the sheet music indicia 302. In other alternative embodiments the display board 300 may include indicia representative of a piano keyboard. The student may then place magnets over the keys that correspond to the desired scale or chord identified by manipulating the selectors 20. In other alternative embodiments the display board 300 may include indicia representative of strings and frets of a guitar. The student may then place magnets over the frets and strings that correspond to the desired note or chord identified by manipulating the selectors 20.

Figure 9:
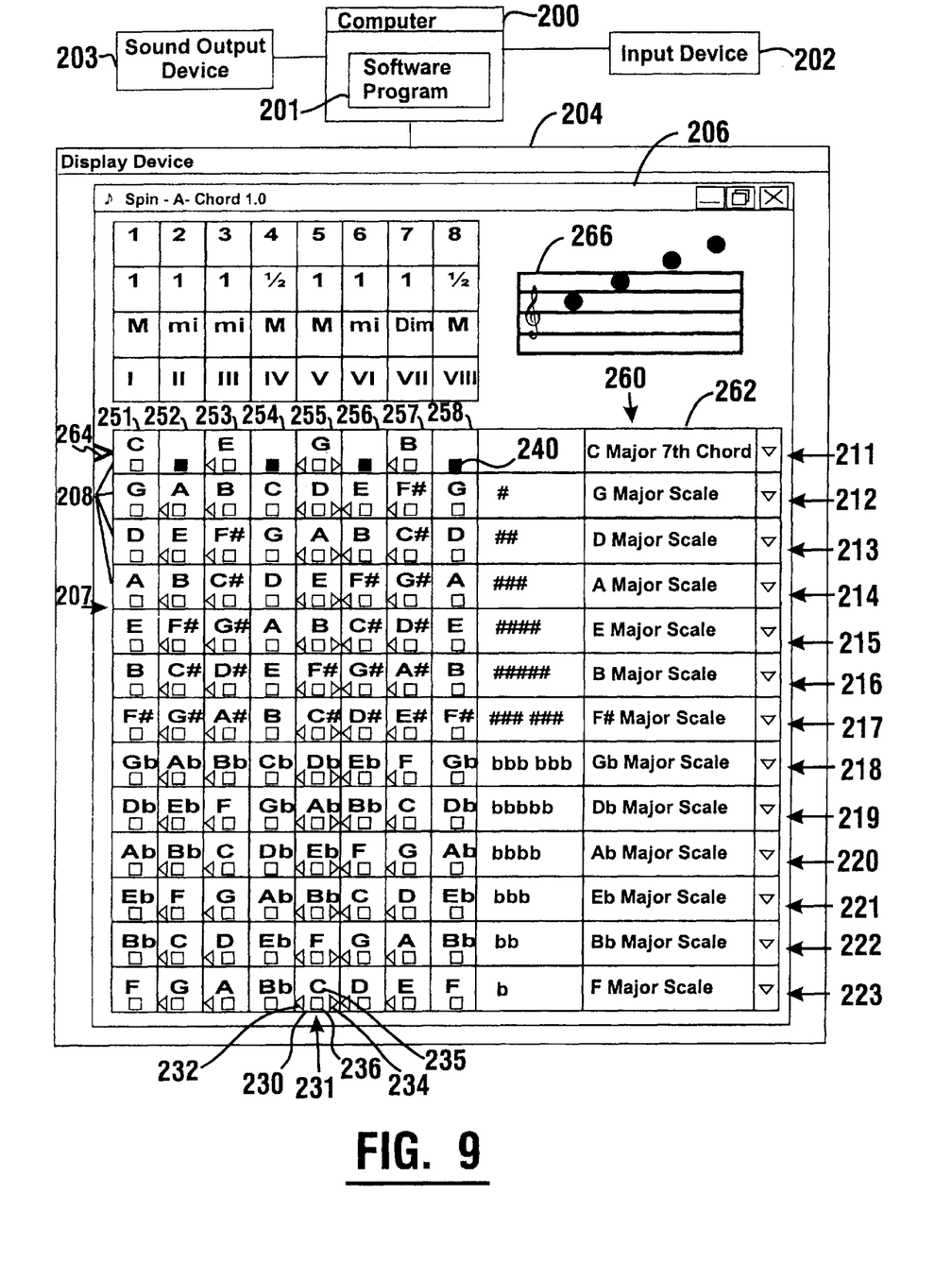
FIG. 9 is a schematic view representative of an alternative exemplary embodiment of the music instruction apparatus in which a computer software function outputs a user interface music note selector object on a display device.

FIG. 9 shows a further alternative embodiment of the present invention that includes a computer 200. The computer includes an input device 202 such as a keyboard, mouse, microphone, touch pad, or any other device operative to input signals into the computer 200 from a user. The computer 200 also includes a display output device 204, such as a computer monitor, LCD display or any other type of output device operative to display indicia representative of musical notes.

Operative in the computer is a music note software function 201. The music note software function responsive to inputs from the input device 202 is operative to direct the computer to output an interactive user interface 206 with the display device 204. The user interface 206 includes a plurality of user objects 207 which are operative as music note selectors 208. The music note selectors 208 are arranged in an array pattern similar to the arrangement of blocks in the previously described embodiment. Each row 211–223 of selectors 208 corresponds to a different Major Diatonic Scale.

Each selector includes user visual clues that are representative of the options available for modifying indicia being displayed by the selector. In the exemplary embodiment these visual clues are representative of VCR type controls. However, in alternative embodiments other types of images, buttons or other user interface elements may be used as visual clues indicative of commands to modify the selector. For example selector 230 includes three visual command object elements 231, a left arrow command object 232, a right arrow command object 234, and a square command object 236. Each of these control objects is associated with a different selector change note action that modifies the indicia being displayed by the selector. For example when the left arrow 232 is selected with an input from input device 202 such as a mouse, the music note indicia 235 ("C") on the selector will change to indicia representative of a note a half step lower in tone ("Cb"). When the right arrow 234 is selected, the selector 230 will change to display indicia representative of a music note that is a half step higher in tone ("C#"). The square indicia 236 is representative of a command to have the selector 230 remove or hide the music note indicia from the selector 230.

Selector 258 for example is representative of a selector where the music note indicia has been removed by clicking with a mouse on the square command object 240. The square command object 240 is operative to change in appearance to indicate that it can be clicked again to have the selector 258 redisplay the music note indicia.

By hiding or removing music note indicia from a selector, indicia representative of a chord can be created. Row 211 includes four selectors 252, 254, 256, and 258 in which the music note indicia has been hidden by a user. The remaining selectors 251, 253, 255, 257 include indicia that corresponds to a C Major 7th chord.

As described in the previous embodiment, the user interface 206 also includes three different types of selectors: a one-way selector such as selector 251, a two-way selector such as selector 253, and a three-way selector such as the previously described selector 230. One-way selectors are operative to display indicia representative of only one music note. Two-way selectors are operative to selectively display two different music notes that are a half step in tone apart. Three-way selectors are operative to selectively display indicia representative of three different notes. Also each of these selectors is controlled by a VCR type control object such as described for selector 230. Also each of these selectors includes a square object control for hiding the music note indicia for creating chords.

The user interface 206 also includes drop-down-list-box elements 260 associated with each row. Each drop-down-list-box 260 includes all of the scales and chords that can be displayed for the corresponding row. For example row 211 has a corresponding drop-down-list-box 262 that includes indicia representative of the scale and chord names such as "C Major Scale", "C Minor Scale", "C Major Triad Chord", "C Major 7th Chord", and all of the other "C" chords that can be formed by a user interactively manipulating the visual command objects of each selector for row 211.

By choosing one of the scales or chords listed in the drop-down-list box 262, the music note software function 201 is operative to change the indicia displayed on the selectors for that row to the note that corresponds to the selected scale or chord. In addition the music note software function 201 is further operative to monitor the indicia being displayed when a user manipulates the visual command objects of the selectors. When the music notes for each selector correspond to one of the scales or chords listed in the associated drop-down-list-box, the music note software function 201 is operative to display the name of the scale or chord in the drop-down-list-box.

This feature is useful for students who wish to test their knowledge of music theory by manipulating the selectors themselves. If the user correctly creates a scale or chord, the drop-down-list-box will display the name of the scale or chord. If the user does not form the scale or chord correctly, the drop-down-list box will display an empty box or error message.

In addition to displaying the name of the scales or chords in the drop-down list-boxes 260, the music note software function 201 is operative to have the user interface 206 include display indicia representative of a music staff 266 with lines and spaces that corresponds to music notes being displayed for the selected row. The user interface includes a visual clue such as an arrowhead 264 that highlights which row is currently being modified by a user. When the user manipulates a different row, the arrow moves adjacent the new row and the user interface alters the sheet music display 266 to correspond to the music notes of the new row.

The sheet music indicia is useful to enable a student to visually learn the corresponding locations of notes on or within the lines of spaces of sheet music. In alternative embodiments the user interface may also display indicia representative of a piano keyboard with keys that are highlighted corresponding to the music notes of a selected row. Also indicia representative of frets and strings of a guitar or indicia representative of any other instrument could be displayed which shows the currently selected scale or chord on that instrument.

It is to be understood that the present invention encompasses any computer system that can be configured or programmed to display indicia representative of music note selectors and is operative to accept input signals from an input device to manipulate the display of music notes. Such computer systems could be hand held systems such as PDAs as well as personal computers. Further, the present invention may be implemented on any computer platform that supports a visual user interface. For example the present invention may be implemented as a software program for an operating system such as Microsoft Windows® 98. In addition the present invention could be implemented as a web page that includes Java™ or DHTML.

In other exemplary embodiments of the present invention the computer 200 may also include output devices such as a sound generating device 203 that is operative to output the tones that correspond to the scales or chords displayed in the user interface. Such a sound generation device may further increase the usefulness of the device as a teaching tool by outputting for the student the sounds that correspond to a desired scale or chord.

In other exemplary embodiments of the present invention the computer 200 may also include games and questions and answers regarding music theory with scales and chords. Exemplary games include the steps of displaying the letter names of a scale such as the "A" scale (notes A B C D E F G A) and having the student manipulate the music note selectors to put in the sharps where they belong (A B C# D E F# G# A) for a particular scale. Other games could include having the a student identify the sharps by manipulating the music note selectors in the correct order for a music staff. The order of Sharps are found in the 7th degree of the Sharp Scales, from top to bottom. The flats are found in the 4th degree of the Flat Scales, from bottom to top.

Part of music theory involves understanding intervals. This is taught by reading lines and spaces on a music staff. Intervals are the relationship between the first of a scale and the other degrees. Example: "C" Scale C to D is a second interval. C to E is a third interval. C to F is a fourth interval. The exemplary array pattern in this music apparatus is designed so that the first column, (first degree of the scale) is in Fifths. This is therefore the same as the circle of fifths and allows the student to find the Major and Minor Chords used in writing a song. For example the Chords used for a song written in the key of "G", would be some form of "G" Chord. The block above would be C. So some form of the "C" Chord would be used. The block below G would be D. Thus some form of the "D" Chord would be used. The minor chords used would be the 6th of the G scale (E minor chord). The 6th of the C scale is "A", so the A minor chord would also be used. Also the 6th of the D scale would be "B". Thus the B minor Chord would be used.

Thus the music instruction apparatus achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained, the new and useful structures, devices, elements, arrangements, parts, combinations, systems, equipment, operations, methods and relationships are set forth in the appended claims.

I claim:

1. A music instruction apparatus comprising:
   a display device, wherein the display device includes a plurality of music note selectors, wherein each music note selector is operative to display indicia representative of a first music note, wherein at least one selector is a two-way selector, wherein the two-way selector is operative to display indicia representative of a second music note responsive to a first selector change note action by a user, wherein the second music note is a half step away in tone from the first music note.

2. The music instruction apparatus according to claim 1, wherein at least one selector is a three-way selector, wherein the three-way selector is operative to display indicia representative of a higher music note responsive to a second change note action by the user, and wherein the three-way selector is further operative to display a lower music note responsive to a third change note action, wherein the higher music note is a half step in tone above the first music note of the three-way selector, and wherein the lower music note is a half step lower in tone from the first music note of the three-way selector.

3. The music instruction apparatus according to claim 1, wherein the second music note is a half step lower in tone than the first music note on the two-way selector, wherein when the first music note indicia are displayed for each selector, the music notes being displayed correspond to a major music scale, wherein when the second music note indicia is displayed for the two-way selector, the displayed music notes correspond to a minor music scale.

4. The music instruction apparatus according to claim 1, wherein the display device includes a support frame, wherein each selector is a block in rotating connection with the support frame, wherein the first selector change note action corresponds to the user rotating the block.

5. The music instruction apparatus according to claim 1, further comprising a computer and an input device in operative connection with the computer, wherein the display device is in operative connection with the computer, wherein the computer is operative to display a user interface with the display device, wherein the selectors are user interface objects of the user interface, wherein the first selector change note action corresponds to a user input from the input device.

6. The music instruction apparatus according to claim 5, further comprising a sound output device, wherein the computer is operative to output tones with the sound output device that corresponds to the displayed music note indicia.

7. A music instruction apparatus comprising:
   a support frame; and
   a plurality of blocks in rotating connection with the support frame, wherein each block includes indicia representative of at least one music note, wherein at least one of the blocks is a multiple note block, wherein the multiple note block includes indicia representative of at least two music notes that are a half step apart in tone, wherein each music note on the multiple note block is selectively viewable.

8. The music instruction apparatus according to claim 7, further comprising an indicia display board in operative connection with the support frame, wherein the indicia display board is operative to display indicia representative of a music staff.

9. The music instruction apparatus according to claim 7, wherein at least one set of eight blocks is in rotating connection with the support frame, wherein portions of the music note indicia on the set of eight blocks corresponds to at least one music scale.

10. The music instruction apparatus according to claim 9, wherein the set includes at least one multiple note block, wherein the multiple note block includes indicia representative of a first music note and a second music note, wherein indicia representative of a major scale is viewable when the multiple note block is oriented in a position where the indicia representative of the first music note is viewable, wherein indicia representative of a minor scale is viewable when the multiple note block is oriented in a position where the indicia representative of the second music note is viewable.

11. The music instruction apparatus according to claim 10, wherein each set of eight blocks includes five multiple note blocks, wherein indicia representative of the first notes of the multiple note blocks share a common first color scheme, wherein indicia representative of the second notes of the multiple note blocks share a second common color scheme.

12. The music instruction apparatus according to claim 11, wherein one of the five multiple note blocks includes indicia representative of a third music note, wherein the second note is a half step below the first note in tone, wherein the third note is a half step above the first note in tone.

13. The music instruction apparatus according to claim 10, wherein each block includes a blank portion, wherein the blank portion does not include indicia representative of music notes, wherein indicia representative of a music chord is viewable when at least three of the eight blocks are oriented in positions where the blank portion is viewable.

14. The music instruction apparatus according to claim 9, wherein thirteen of the sets of eight blocks are in pivoting connection with the support frame, wherein the indicia on each set corresponds to one of the thirteen major diatonic music scales.

15. The music instruction apparatus according to claim 7, wherein the blocks are positioned in an array pattern, wherein the array pattern includes thirteen rows and eight columns, wherein each row corresponds to a different music scale.

16. The music instruction apparatus according to claim 15, wherein the support frame includes a plurality of key signature labels, wherein each key signature label is located adjacent each row, wherein each key signature label includes indicia representative of the key signature of the corresponding major scale for the row.

17. The music instruction apparatus according to claim 15, wherein the support frame includes a plurality of column labels, wherein at least one column label is located adjacent each column, wherein each column label includes indicia representative of a number, wherein each column is consecutively labeled one through eight.

18. The music instruction apparatus according to claim 15, wherein all of the blocks in the second, third, fifth, sixth, and seventh columns are multiple note blocks, wherein the blocks in the fifth column include indicia representative of three music notes.

19. The music instruction apparatus according to claim 7, further comprising a plurality of rods in supporting connection with the support frame, wherein each block is in rotating connection with one of the rods.

20. The music instruction apparatus according to claim 7, wherein each block has the shape of a cube, wherein each block includes four sides that are selectively viewable, wherein at least one side includes indicia representative of a single music note, wherein at least one side does not include indicia representative of a single music note.

* * * * *